(12) United States Patent
Richter et al.

(10) Patent No.: US 9,369,824 B2
(45) Date of Patent: Jun. 14, 2016

(54) SYSTEM FOR COMMUNICATING WITH COMPUTING DEVICES IN AN ALTERNATING ELECTRIC FIELD ENVIRONMENT

(71) Applicant: R2Z Innovations, Inc., Vancouver (CA)

(72) Inventors: Wolfgang Richter, NW (DE); Faranak Zadeh, Vancouver (CA)

( * ) Notice: Subject to any disclaimer, the term of this patent is extended or adjusted under 35 U.S.C. 154(b) by 155 days.

(21) Appl. No.: 14/222,689

(22) Filed: Mar. 24, 2014

(65) Prior Publication Data

US 2015/0271624 A1   Sep. 24, 2015

(51) Int. Cl.
*G01R 15/16* (2006.01)
*H04W 4/00* (2009.01)
*G06Q 30/02* (2012.01)

(52) U.S. Cl.
CPC ........... *H04W 4/008* (2013.01); *G06Q 30/0241* (2013.01)

(58) Field of Classification Search
CPC ......... H04W 4/00; H04W 4/008; G06Q 30/02
See application file for complete search history.

(56) References Cited

U.S. PATENT DOCUMENTS

| | | | | |
|---|---|---|---|---|
| 5,663,662 A * | 9/1997 | Kurosawa | ......... | H01L 27/11807 257/208 |
| 5,887,132 A * | 3/1999 | Leung | ................. | G06F 13/4086 709/200 |
| 9,092,129 B2 * | 7/2015 | Abdo | .................... | G06F 3/0488 |
| 2005/0162411 A1 * | 7/2005 | Berkel van | .......... | G06F 3/03545 345/179 |
| 2009/0252024 A1 * | 10/2009 | Maeda | ................... | B82Y 10/00 369/126 |
| 2011/0269414 A1 * | 11/2011 | Falck | .................... | A61B 5/0028 455/100 |
| 2012/0004523 A1 * | 1/2012 | Richter | ................ | A61B 5/0002 600/345 |
| 2012/0112828 A1 * | 5/2012 | Richter | ................... | H02J 17/00 327/564 |
| 2012/0295684 A1 * | 11/2012 | Richter | ............... | A63F 3/00643 463/16 |

\* cited by examiner

*Primary Examiner* — Huy Q Phan
*Assistant Examiner* — Alvaro Fortich

(57) ABSTRACT

The present invention provides an electronic circuitry system receiving the modulated alternating electric field from a computing device, the electronic circuitry is attached to the body of the user and further the electronic circuitry system communicates with the computing device. The electronic circuitry system includes a first electrode capacitively coupled with the modulated alternating electric field, an electronic sub-circuit for receiving and processing the modulated alternating electric field from the first electrode and a second electrode connected to said electronic sub-circuit to float the modulated alternating electric field through the body of the user with respect to the ground. The electronic circuitry further includes a hub device for communicating with said communication unit. The hub device includes housing, a generator for generating alternating electric field, a micro-controller for generating modulated commands and electric field bidirectional communication unit for communicating generated modulated commands through the alternating electric field and a power source.

18 Claims, 3 Drawing Sheets

SYSTEM FOR COMMUNICATING WITH COMPUTING DEVICES IN AN ALTERNATING ELECTRIC FIELD ENVIRONMENT

BACKGROUND OF THE INVENTION

1. Field of the Invention

The present invention generally relates to a Smart Logo, and more specifically relates to a system for communicating with and receiving modulated alternating electric field from the computing device.

2. Description of Related Art

A logo is a symbol that can provide consumers with instant and powerful brand recognition of business, products and services. A logo of an established business is vulnerable and easy to fake or to copy. In order to exploit the vulnerability, the competitors may create look-alike or similar logos for their products to capture the market share. This practice enables the small competitors of established brand to produce low quality products and sell it for high profits in the name of established brands, thus a brand does not only lose its market share but also loses brand value.

Many products contain barcode or RFIDs which can provide the customer with the details of the products and services. This procedure forces consumer to use scanning device or smart phones and takes away the focus from the related product. Consumers like to touch products in a shop to get a tactile impression which maybe the only left advantage of retail shops against online shopping which is more based on visual impressions and ratings of other customers. Consumers get annoyed or confused by digital signage and big screen advertising of unwanted products.

With the present methods (like RFID and barcode) the customers are deprived of this tactile experience. Also, there has been a problem of people facing the problem of loosing articles and thus many devices are available to locate the missing articles. However, such devices work only when you come to know about the loss of the article.

Furthermore, existing barcodes fail to determine the quality of the object. No means are provided in the packaging to determine the change in the quality of the object. Therefore, there is a need of a method and a system for communicating the object details with computing devices in an alternating electric field environment. Further, the method and a system should communicate the change in the state of object, user using the alternating electric field with the computing devices.

SUMMARY OF THE INVENTION

In accordance with the teachings of the present invention, an electronic circuitry system receiving the modulated alternating electric field from a computing device and communicating the information related to the object and the user with the computing device is provided.

An object of the present invention is to provide an electronic circuitry system receiving the modulated alternating electric field from a computing device, the electronic circuitry is attached to the body of the user and further the electronic circuitry system communicates with the computing device. The electronic circuitry system includes a first electrode capacitively coupled with the modulated alternating electric field, an electronic sub-circuit for receiving and processing the modulated alternating electric field from the first electrode and a second electrode connected to the electronic sub-circuit to float the modulated alternating electric field through the body of the user with respect to the ground.

The electronic sub-circuit includes an energy converter for converting the modulated alternating electric field to DC energy, a communication unit decodes the received modulated alternating electric field from the first electrode for generating a decoded command, a command interpreter interprets the decoded command from the communication unit for generating a first signal, a function block to process the signals received from the command interpreter and transmitting the processed signals to the computing device.

The function block processes the first signal received from the command interpreter and measures the initial value of modulated alternating electric field and compares it with the change in the values of the modulated alternating electric field and transfers the resulted information from comparison to the computing device. The change in the measure of alternating electric field is either based on movement of the user, change in properties (such as physical or chemical) of the object.

The electronic circuitry includes a hub device for communicating with the communication unit. The hub device includes a housing, a generator for generating alternating electric field, a micro-controller for generating modulated commands and electric field bidirectional communication unit for communicating generated modulated commands through the alternating electric field; and a power source to power the generator; wherein the modulated commands to be processed by the function block.

The hub device equipped with sensors and MEMS for physical measurements of its own or as a reference base for attached electronic circuitry (smart logos) in proximity. The hub device may also be equipped with actors such as LEDs, displays, piezo, buzzers etc. The housing has smallest dimensions to integrate into but not limited to a watch, pen, helmets, glasses, belts, gloves, wristbands, shelves, sits, fitness equipment for stationary use.

The hub device powers and communicates with all electronic circuitry (smart logos) in proximity and organizes them with temporary ID numbers and time slots so that the hub device operates collision free in an environment where many electronic sub circuit, first electrode and second electrode are present.

In another embodiment of the present invention the hub device energizes the electronic circuitry sub circuit through the first electrode which is attached on the bread. The water presents in the fresh bread cause the electronic circuitry to ground. As water has low impedance, which results in a high capacitance of the alternating electric field and similarly high capacitance means high capacitive coupling of the alternating electric field. When the bread ages, the water evaporates and the bread becomes dry. This results in a smaller capacitance to ground and a higher voltage level (but lower electrical current) for the electronic sub circuitry.

Another preferred application for the electronic circuitry is the attachment to packages which makes them interactive. The hub device powers and operates all objects having electronic sub circuit. They will sense the approach or a touch of a living being and may start triggering advertising, or getting attraction of the object with blinking or sound means (LEDs, displays, electro lumina sense traces, and buzzing sounds using the package as resonator). The electronic circuitry (smart logos) may also power and operate external devices like analog front ends, silicon batteries, fRAMS, EPROMs, additional sensors or actors.

Another object of the present invention is to provide the electronic circuitry system attached to the body of a user and it receives the alternating electric field from the computing device present near the user. The measure of initial electric field is stored in registers present in the electronic sub circuit. When the user moves his body in order to exercise, the electric field received by the electronic sub circuit system through the first electrode is disturbed in accordance with the variable distance of user's body with the ground and the information corresponding to these changes is recorded and viewed in the computing device.

These and other objects, features and advantages of the invention will become more fully apparent in the following detailed description, taken in conjunction with the accompanying drawings.

BRIEF DESCRIPTION OF THE INVENTION

DETAILED DESCRIPTION OF THE INVENTION

Figure 1:
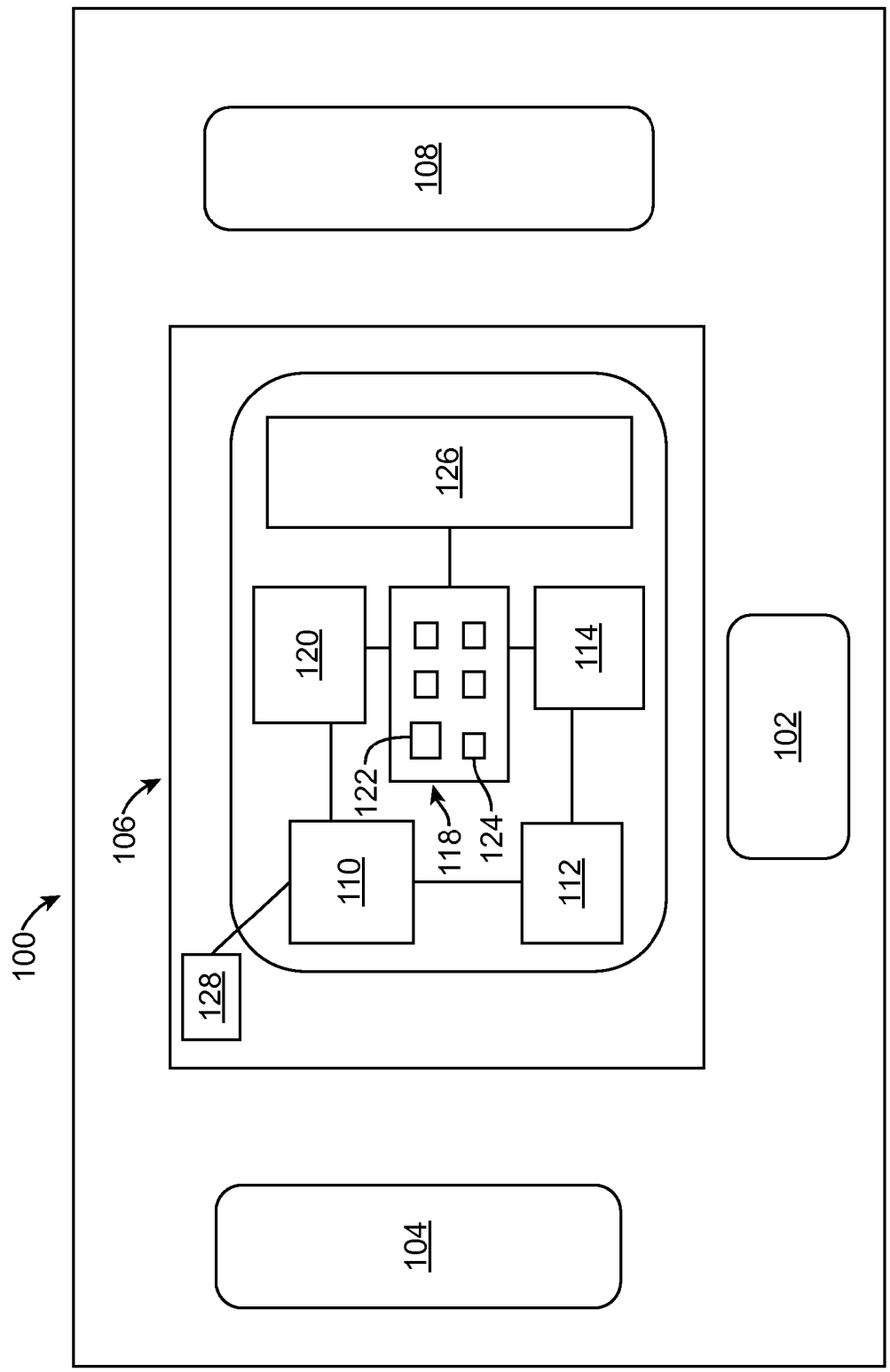
FIG. 1 illustrates a block diagram of the electronic circuitry system for communicating with and receiving modulating alternating electric field from a computing device, in accordance with a preferred embodiment of the present invention.

While this technology is illustrated and described in a preferred embodiment, a system for communicating with and receiving modulated alternating electric field from the computing device may be produced in many different configurations, forms and materials. There is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

FIG. 1 illustrates a block diagram of the electronic circuitry system 100 for communicating with and receiving modulating alternating electric field from a computing device 102, in accordance with a preferred embodiment of the present invention. The electronic circuitry system 100 is detachably attached article worn by user. A preferred embodiment of the electronic circuitry system 100 attached to the article worn by the user is explained in detailed in conjunction with the FIG. 3 of the present invention.

The electronic circuitry system 100 includes a first electrode 104 capacitively coupled with the modulated alternating electric field, an electronic sub circuit 106 for receiving and processing the modulated alternating electric field from the first electrode 104, and a second electrode 108 is connected to the electronic sub-circuit 106 for floating the modulated alternating electric field through the body of the user with respect to the ground.

Ina preferred embodiment of the present invention, the electronic sub circuit 106 includes an energy converter 110 for converting modulated alternating electric field to DC energy, a communication unit 112 for decoding the received modulated alternating electric field received from the first electrode 104 for generating a decoded command, a command interpreter 114 interprets the decoded command received from the communication unit 112 for generating a first signal.

Examples of energy converter 110 includes but not limited to transducers. It would be readily apparent to those skilled in the art that various energy converter 110 may also be used without deviating from the scope of the present invention. The electronic circuit system 100 further includes a function block 116. The function block 116 further includes a digital function block 118 and an analog function block 120. The digital function block 118 is connected to the command interpreter 114.

The digital function block 118 further includes plurality of registers 122 and plurality of logic gates 124, wherein the combination of the plurality of registers 122 and plurality of logic gates 124 receives the first signal from the command interpreter 114 for processing and transmitting the first signal to the communication unit 112. The communication unit 112 modulates and further transmits the processed signal to the computing device 102.

The analog function block 120 receives modulated alternating electric field from the computing device 102. The analog function block 120 calculates the measure of initial modulated alternating electric field and further storing the initial measure value as a reference value in the register. The analog function block 120 measures the variation in strength of modulated alternating electric field generated through the movement of the user for comparing with the reference value stored in the register 122 and further generating and transmitting the results to the communication unit 112, wherein further the communication unit 112 modulates and transmits the results to the computing device 102.

The analog function block 120 in combination with the digital function block 118 configured as analog to digital converter and digital to analog converter for sending processed signals to the communication unit 112. The communication unit 112, a command interpreter 114, and function block 116 are explained in detail in conjunction with the FIG. 3 of the present invention.

The electronic circuit system 100 further includes a switch matrix 126 for creating links in between at least one of the logic gates 124 and at least one of the register 122. Further, the second electrode 108 completes the electrical circuit by floating the modulated alternating electric field through the body of the user with respect to the ground.

In another embodiment of present invention, it also includes a DC buffer 128 for storing DC energy. The examples of DC buffer 128 include capacitor, accumulator and silicone batteries.

Figure 2:
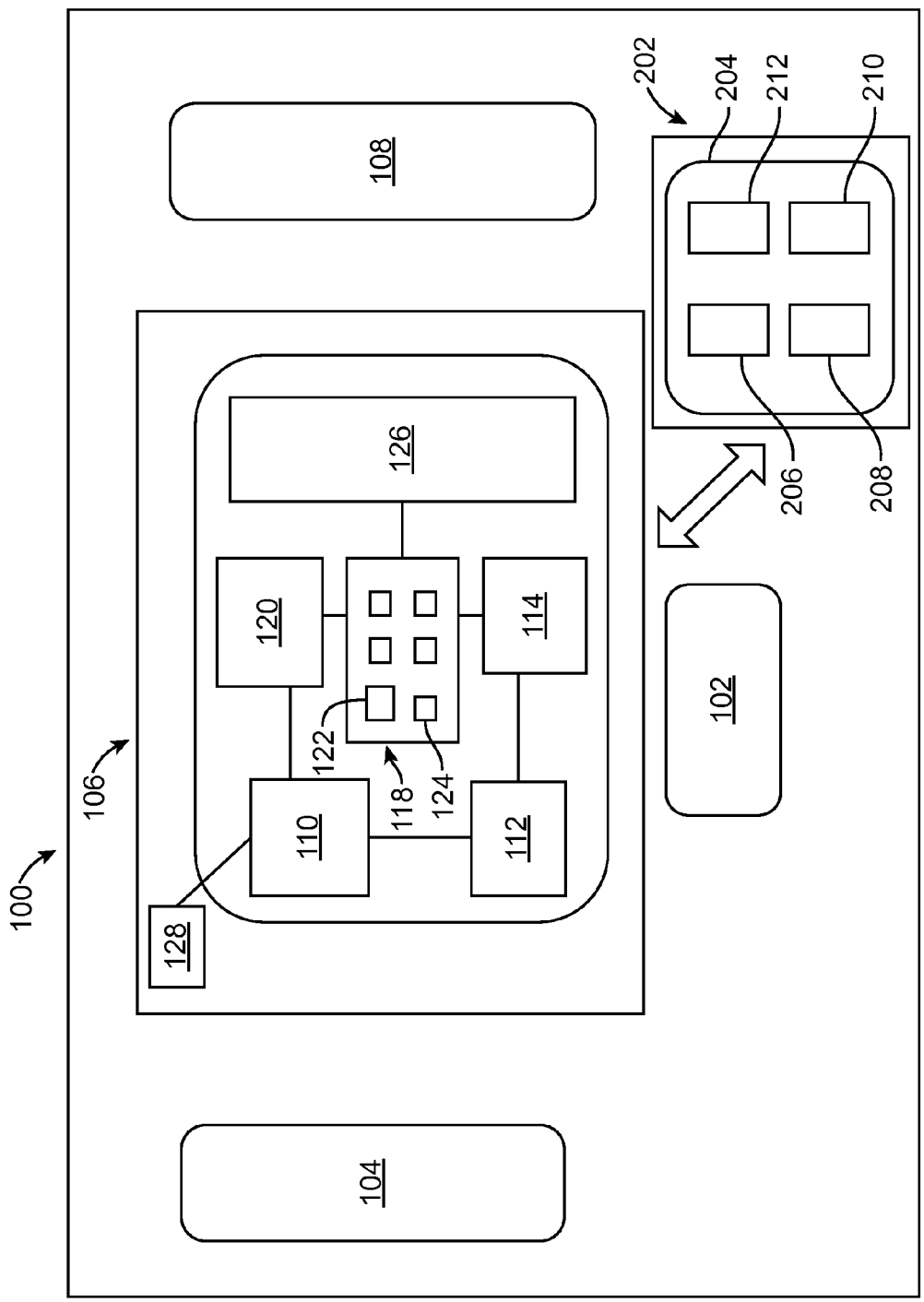
FIG. 2 illustrates a block diagram of the electronic circuitry system receiving modulated alternating electric field from a hub device.

FIG. 2 illustrates another block diagram of the electronic circuitry system 100 for communicating with a computing device 102, in accordance with another embodiment of the present invention. The electronic circuitry system 100 further includes a hub device 202 communicating with the communication unit 112 through the first electrode 102. The hub device 202 includes a housing 204, a generator 206 for generating the alternating electric field, a micro-controller 208 for generating modulated commands, an e-field bidirectional communication unit 210 for communicating generated modulated commands through the alternating electric field with the communication unit 112 through the first electrode 102, and a power source 212 to power the generator 206.

Example of power source 212 includes but not limited to battery. Further, examples of the housing 204 include but not limited to a pen, belt, ring, mobile phones, Ipad etc. Furthermore, the examples of e-field bidirectional communication unit 210 includes but not limited to AM or FM, or PhaseShift, SpreadSpectrum modulators/demodulators or modems.

Further examples of generator 206 includes but not limited to electrodes, diodes, oscillators, PWM based circuits, VCO (Voltage Controlled Oscillator), DAC (Digital-to-Analog Converter), gates, multivibrators etc. However, it will be readily apparent to those with ordinary skill in the art that the various other types of generator 206 may also be used for generating electric field without deviating from the scope of the present invention.

Figure 3:
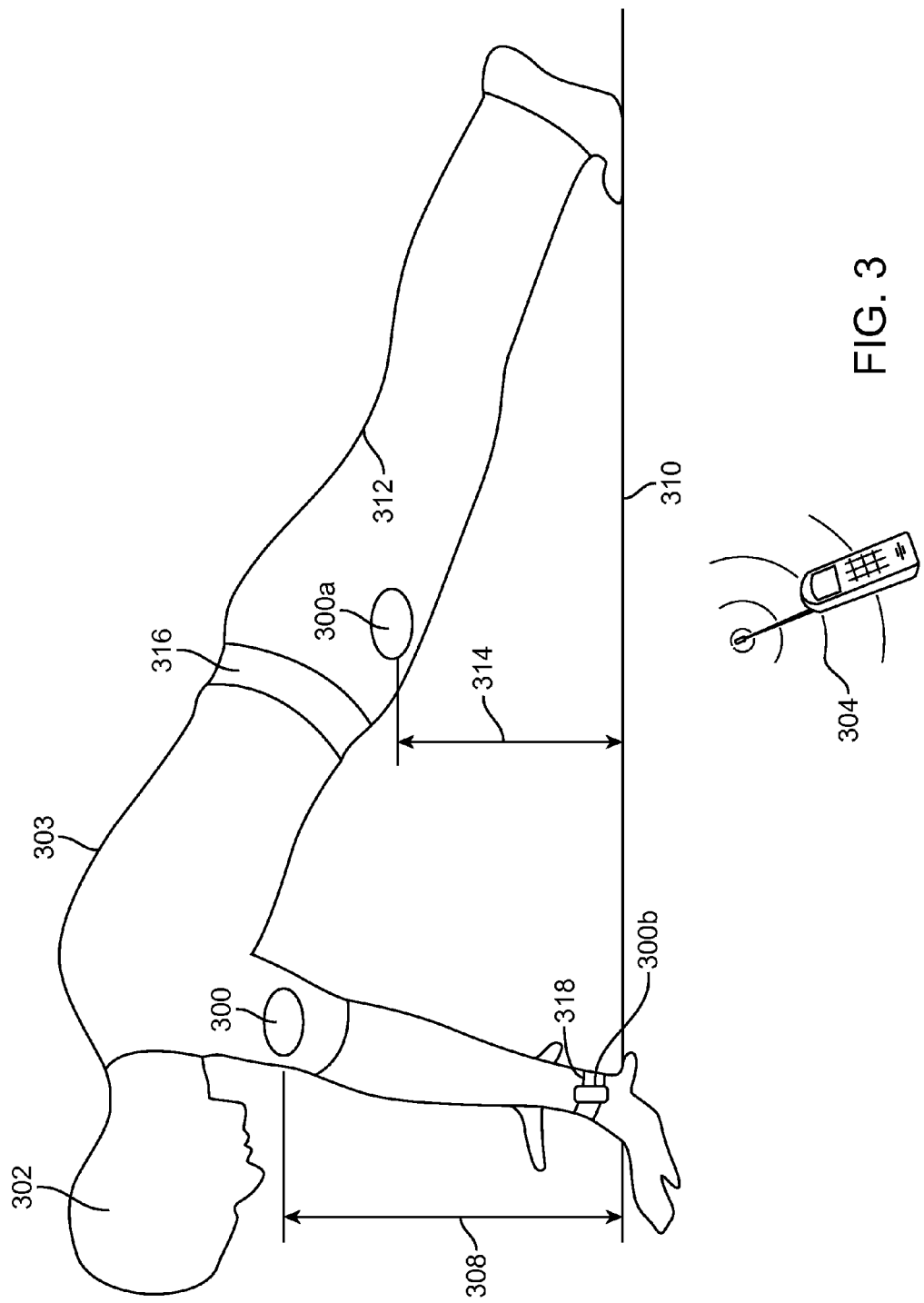
FIG. 3 illustrates an exemplary embodiment of the electronic circuitry system attached to an athlete for measuring performance.

FIG. 3 illustrates an exemplary embodiment of the electronic circuitry system 300 attached to article worn by an athlete 302 for measuring performance. Examples of article include but not limited to clothes, shoes, belts etc. The electronic circuitry system 300 is attached to the shirt 303 of the athlete 302. The electronic circuitry system 300 receives modulating alternating field from the computing device 304. The electronic circuitry system 300 wherein the function block (not shown in FIG. 3) processes the signals received from the modulated alternating and then the processed signals are transferred to the computing device 304.

In an exemplary embodiment as shown in FIG. 3, the distance 308 of the arm to the ground 310 is measured by the analog function block (not shown in FIG. 3) based on the strength of the electric field and further stores it as a reference value in the registers of the digital function block.

When the athlete 302 moves his body, a change in the electric field is noted and is again measured by the determining the change in the strength of modulating alternating electric field. During push-ups, an athlete 302 moves up and down and thus the change in strength of the electric field is determined to calculate the changed distance 308 in between arm and ground and the processed results are further send to the computing device 304.

In another preferred embodiment of the present invention, another electronic circuitry system 300*a* is attached on the trousers 312 of the athlete 302. During push up, the another electronic circuitry system 300*a* determines the distance 314 of the thighs from the ground 310 by measuring the strength of the alternating electric field in normal position as a reference value and also measuring the change in the strength of the electric field after the movement of the athlete 302, resulting in determination of the distance 314.

In another embodiment of the present invention, the electronic circuit system 300 may further include a hub device 316 for communicating with the communication unit (not shown in FIG. 3) of the electronic sub circuit (in reference to FIG. 1 and FIG. 2 of the present invention). The hub device 316 generates modulated alternating electric field through the generator (not shown in FIG. 3) with decoded commands from the micro-controller (not shown in FIG. 3).

The strength of the alternating electric field is measured and processed by the function block (not shown in FIG. 3) of the electronic sub circuit. In a preferred embodiment and as shown in FIG. 3 of the present invention, the housing of the hub device 316 is a belt. However, it will be readily apparent to those skilled in the art that other types of housing may also be used without deviating from the scope of the present invention.

In another preferred embodiment of the present invention, another electronic sub circuit 300*c* is attached as a LOGO on the bracelet 318 of the athlete 302. The electronic sub circuit 300*c* may further include one or more actors connected to the switch matrix (not shown in FIG. 3).

In another preferred embodiment of the present invention, the hub device 316 further generates a unique identification number for identifying each of the electronic circuitry system 300, 300*a* and 300*b* within the generated alternating electric field environment. For exemplary purposes, the hub device 316 generates 0.01 as unique identification number for the digital function block (not shown in FIG. 3) of electronic circuitry system 300, 300.02 for digital function block (not shown in FIGS. 3) 300*a* and 0.03 for digital function block (not shown in FIG. 3) 300*b*.

In a preferred embodiment of the present invention, the digital function block (not shown in FIG. 3) responds back to the hub device 316 at regular intervals. The hub device 316 determines the change in position of the electronic circuitry system 300, 300*a* and 300*b* by measuring the change in the strength of the alternating electric field from initial measured value of alternating electric field i.e. before the change in position.

The following embodiments are not shown in Figures but are explained to describe the scope of the present invention. In another preferred embodiment of the present invention, the electronic circuitry system is attached to a food product. Examples of the food product include but not limited to banana, milk, chocolate etc. The analog function block determines the initial measured value of the strength of the electric field passing through the food product and notifies to the computing device through communication unit on receiving a change in the strength of the electric field passing through the food product. Thus, a user knows about the change in quality of the food product.

In another preferred embodiment of the present invention, the electronic circuitry system is attached to an object. The analog function block may be programmed with information of the object. The analog function block measures the variation in strength of modulated alternating electric field and then communicates the stored information of the object with the computing device. For example, electronic circuitry system is attached to Phone's logo. Once a user touches the logo, the analog function block displays the information related to the phone on the computing device. In another embodiment, the information is first sent to the hub device and thereafter is sent to the computing device.

In another preferred embodiment of the present invention, the electronic circuitry system further includes one or more sensors connected to the function block for sensing physical changes within the user's environment. Examples of such sensors include but not limited to orientation sensors, microphones, electro-chemical markers or gels, environmental sensors etc. For exemplary purposes, a sensor may be a microphone. The microphone may be attached to a user to receive audio signals. The function block then processes the audio signals received from microphone and transfer the results to the computing device.

In another preferred embodiment of the present invention, the electronic circuitry system further includes one or more actors connected with the function block for responding to the modulated commands received from the hub device. Examples of actors include but not limited to LEDs, display units, electroluminescent traces, buzzers, vibrators etc. For exemplary purposes, an actor may be an earphone. The earphone may be attached to a user to receive audio signals. The function block then processes the audio signals received from microphone and transfer the results to the earphone.

In another preferred embodiment of the present invention, the electronic circuitry system further includes a wireless communication unit connected to the micro-controller for communicating the modulated commands with the computing device. Examples of such wireless communication unit include but not limited to wi-fi, Bluetooth, routers etc.

The present invention may be implied to multiple applications. Herein after for exemplary purposes, many such examples have been explained to determine the applications of the present invention. The present invention offers various advantages such as:

a) The electronic circuitry system "SmartLogos" embedded in sport apparel assists in explaining the function of the good and their training features in the shop, if touched by a consumer. It does not matter if the Smart Logo is attached to the product itself or its package. After buying, an athlete can use the "SmartLogo's" sensing features for training purposes, as the logo can sense and report movements, forces, or shocks of the consumer to the computing device (e.g. Smart phone).

b) The electronic circuitry system embedded in jewelry as SmartLogos, create illuminating and sparkling effects to make jewellery more attractive. The present invention may track user's movement and invoke trigger events such as earring may start a video/audio recording if the user nodded their head in a specific way. Further, the present invention generates alert messages for the user in case of theft and furthermore transmits commands to the computing device when touched or moved.

c) The electronic circuitry system embedded may be attached on food products on packaging of the food product. The information related to the nutrition and other features are digitally presented to the consumer through the computing device. The quality of food may also be monitored as the food's material/ingredients act like a dielectric between the attached "electronic circuitry system" and the ground.

Additionally provided herein are a series of particular exemplary applications and/or embodiments illustrative of the applicability of aspects of the herein disclosed devices, systems, and methods in a variety of contexts. As will be appreciated in light of the instant disclosure, the disclosure is not limited to these examples, but rather is inclusive of all embodiments for which the illustrative aspects described herein may be realized.

Those of skill in the art will appreciate that the herein described systems may be subject to various modifications and alternative constructions. There is no intention to limit the scope of the disclosure to the specific exemplary embodiments, applications, and/or constructions described herein. Rather, the herein described devices, systems are intended to cover all modifications, alternative constructions, and equivalents falling within the scope and spirit of the claimed invention and its equivalents.

The invention claimed is:

1. An electronic circuitry system for communicating with and receiving modulated alternating electric field from a computing device, further said electronic circuitry system detachably attached to an article worn by a user and said electronic circuitry system comprising:
   a first electrode capacitively coupled with the modulated alternating electric field;
   an electronic sub circuit for receiving and processing the modulated alternating electric field from said first electrode, said electronic sub circuit comprising:
      an energy converter for converting the modulated alternating electric field to DC energy;
      a communication unit decodes the received modulated alternating electric field from said first electrode for generating a decoded command;
      a command interpreter interprets the decoded command received from said communication unit and further said command interpreter generates a first signal;
   a function block comprising:
      a digital function block connected to said command interpreter, said digital function block comprising:
         plurality of registers; and
         plurality of logic gates;
      wherein the combination of said registers and said logic gates receives said first signal from said command interpreter for processing and transmitting the first signal to said communication unit, wherein said communication unit modulates and further transmits the processed first signal to said computing device;
      an analog function block receives modulated alternating electric field from said computing device, further said analog function block calculates the measure of initial modulated alternating electric field and further storing the initial measured value as a reference value in said register, further said analog function block measures the variation in strength of modulated alternating electric field generated through the movement of the user for comparing with said reference value stored in said register and further generating and transmitting the results to said communication unit, wherein said communication unit modulates and transmits the results to said computing device;
   a switch matrix for creating links in between said digital function block and said analog function block; and
   a second electrode connected to said electronic sub circuit for floating modulated alternating electric field through the body of the user with respect to the ground; and
   a hub device carried b the user for communicatin. with said communication unit said hub device comprising:
      a housing;
      generator for generating alternating electric field;
      a micro-controller for generating modulated commands;
      e-field bidirectional communication unit for communicating generated modulated commands through the alternating electric field with said communication unit through said first electrode: and
      a power source to power said generator;
   wherein said modulated commands to be processed by said function block.

2. The electronic circuitry system according to claim 1 further comprising a one or more actors connected with said function block for responding to the modulated commands received from said hub device.

3. The electronic circuitry system according to claim 1 wherein said hub device further comprising a wireless communication unit connected to said microcontroller for communicating the modulated commands with said computing device.

4. The electronic circuitry system according to claim 1 further comprising one or more sensors connected to said function block for sensing physical changes within the user's environment.

5. The electronic circuitry system according to claim 1 wherein said micro-controller generates one or more unique identification number for identifying said digital function block.

6. The electronic circuitry system according to claim 1 wherein said function block processes audio signals from the user's environment for communicating it with said computing device.

7. The electronic circuitry system according to claim 1 further comprising a DC buffer for accumulating and storing DC energy.

8. The electronic circuitry system according to claim 5 wherein said micro-controller sends notifications for change in the strength of the modulated alternating electric field received from the user at regular intervals to said computing device.

9. An electronic circuitry system detachably attached to an object for receiving modulated alternating electric field from a computing device, further said electronic circuitry system communicating change in the user's environment with said computing device, said electronic circuitry system comprising:
- a first electrode capacitively coupled with the modulated alternating electric field;
- an electronic sub circuit for receiving the modulated alternating electric field from said first electrode, said electronic sub circuit comprising:
  - an energy converter for converting the modulated alternating electric field to DC energy;
  - a communication unit decodes the received modulated alternating electric field from said first electrode for generating a decoded command;
  - a command interpreter interprets the decoded command from said communication unit and further said command interpreter generates a third signal;
  - a function block:
    - a digital function block connected to said command interpreter, said digital function block comprising: plurality of registers; and plurality of logic gates;
      wherein the combination of said registers and said logic gates receive said third signal from said command interpreter for processing and transmitting the third signal to said communication unit, wherein said communication unit modulates and further transmits the processed third signal to said computing device;
    - an analog function block receives modulated alternating electric field from said computing device, further said analog function block calculates the measure of initial modulated alternating electric field corresponding to the object and further transmitting the initial measured value for storing the initial measured value as a reference value in said register, further said analog function block measures the variation in strength of modulated alternating electric field received from said computing device corresponding to the state of the object and further comparing the change in strength with said reference value stored in said register and further transmitting the results to said communication unit for modulating the results;
  - a switch matrix for creating links in between said registers, said logic gates and said analog function block; and
- a second electrode connected to the electronic sub circuit for floating alternating electric field with respect to the ground on receiving change in the user's environment; and
- a hub device carried by the user for communicating with said communication unit, said hub device comprising;
  - a housing;
  - generator for generating alternating in electric field;
  - a micro-controller for generating modulated commands;
  - e-field bidirectional communication unit for communicating generated modulated commands through the alternating electric field; and
  - a power source to power said generator;
  wherein said modulated commands to be processed by said function block.

10. The electronic circuitry system according to claim 9 wherein said analog function block measures the variation in strength of modulated alternating electric field received from said computing device corresponding to the chemical properties of the object.

11. The electronic circuitry system according to claim 9 further comprising a one or more actors connected to said function block for responding to the modulated commands received from said hub device.

12. The electronic circuitry system according to claim 9 wherein said hub device further comprising a wireless communication unit connected to said micro-controller for communicating the modulated commands with said computing device.

13. The electronic circuitry system according to claim 9 further comprising one or more sensors connected to said function block for sensing physical changes within the user's environment.

14. The electronic circuitry system according to claim 9 wherein said micro-controller generates one or more unique identification number for identifying said digital function block.

15. The electronic circuitry system according to claim 9 wherein said function block processes audio signals from the user's environment for communicating it with said computing device.

16. The electronic circuitry system according to claim 9 further comprising a DC buffer for accumulating and storing DC energy.

17. The electronic circuitry system according to claim 9 wherein said micro-controller sends notifications for change in the strength of the modulated alternating electric field received from the user at regular intervals to said computing device.

18. The electronic circuitry system according to claim 9 further comprising a smart logo for embedding said first electrode, said electronic sub circuit, and said second electrode, further said logo attached to the object.

* * * * *